US012812464B2

(12) United States Patent
Ina

(10) Patent No.: US 12,812,464 B2
(45) Date of Patent: Nov. 24, 2026

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Eigoro Ina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 813 days.

(21) Appl. No.: 17/711,085

(22) Filed: Apr. 1, 2022

(65) Prior Publication Data

US 2022/0330088 A1 Oct. 13, 2022

(30) Foreign Application Priority Data

Apr. 7, 2021 (JP) ................................ 2021-065366

(51) Int. Cl.
*H04W 28/06* (2009.01)
*H04L 5/00* (2006.01)
*H04W 84/12* (2009.01)

(52) U.S. Cl.
CPC ......... *H04W 28/065* (2013.01); *H04L 5/0055* (2013.01); *H04W 84/12* (2013.01)

(58) Field of Classification Search
CPC .... H04W 28/065; H04W 84/12; H04L 5/0055
See application file for complete search history.

(56) References Cited

U.S. PATENT DOCUMENTS

2013/0145224 A1* 6/2013 Kim ...................... H04L 1/0003 714/704
2021/0091887 A1* 3/2021 Cho ...................... H04L 1/0061
2021/0219236 A1 7/2021 Ina
2021/0385111 A1 12/2021 Ina
2022/0116192 A1* 4/2022 Noh ...................... H04L 5/0091
2023/0145901 A1* 5/2023 Li ......................... H04L 1/1614 370/216
2023/0156795 A1* 5/2023 Hwang ............ H04W 74/0816 370/329
2023/0217494 A1* 7/2023 Li ............................ H04L 7/04 370/350

FOREIGN PATENT DOCUMENTS

JP 2009-088915 A 4/2009

* cited by examiner

*Primary Examiner* — Kevin T Bates
*Assistant Examiner* — Jaeyoung Kwak
(74) *Attorney, Agent, or Firm* — Carter, DeLuca & Farrell LLP

(57) ABSTRACT

A communication apparatus concurrently transmits packets to the partner apparatus on a plurality of links, determines whether an acknowledgment for a transmitted packet has been received on each of the plurality of links, and if it is determined that an acknowledgment for a first packet transmitted on a first link among the plurality of links has not been received, generates a changed first packet having an increased packet length by reducing a data rate of the first packet, and generating a changed subsequent packet by increasing the packet length of a packet subsequent to a packet transmitted on each of one or more links other than the first link among the plurality of links, and concurrently transmits the changed first packet on the first link and the changed subsequent packet on each of the one or more links other than the first link.

7 Claims, 4 Drawing Sheets

COMMUNICATION APPARATUS, METHOD FOR CONTROLLING COMMUNICATION APPARATUS, AND STORAGE MEDIUM

BACKGROUND OF THE INVENTION

Field of the Invention

The present invention relates to wireless communication technology.

Description of the Related Art

The IEEE 802.11 series is known as a wireless Local Area Network (LAN) communication standard established by the Institute of Electrical and Electronics Engineers (IEEE). As the IEEE 802.11 series standard, there are standards such as the IEEE 802.11a/b/g/n/ac/ax standard. In IEEE, the establishment of the IEEE 802.11be standard is being considered as a new standard of the IEEE 802.11 series in order to further improve the throughput and the frequency utilization efficiency. In the IEEE 802.1 the standard, multi-link communication is being considered in which one access point (AP) establishes a plurality of links with one station (or terminal apparatus, STA) via a plurality of different frequency channels and performs parallel communication.

In multi-link communication, if the frequency channels that are used are sufficiently separated from each other, the radio signals used in each link do not cause interference with each other, and thus it is possible to transmit and receive the radio signals at any time. However, if the frequency channels are close to each other, the radio signals used in each link may cause interference with each other. For example, if a certain device starts transmission operation on one link while performing reception operation on another link, radio waves emitted by the device interfere with the received signal, and thus it may not be possible to concurrently perform transmission and reception. In this case, the device can use the links without causing interference by adjusting the timing of transmission and the timing of reception on the links.

On the other hand, in a wireless LAN, wireless communication is performed by transmitting and receiving packets that have a certain period of length as a unit. The length of the packet is determined by the amount of data transmitted, the radio modulation scheme, the coding rate, and the like. The combination of the radio modulation scheme and the coding rate is indexed in advance as the Modulation and Coding Scheme (MCS), and the MCS can be determined on the basis of the communication quality and the like. Generally, the higher the MCS is, the higher the order of the modulation method is set. By setting the MCS higher, the data rate increases, and if the amount of data is the same, the packet length can be shortened, but on the other hand, the communication distance is shortened. Japanese Patent Laid-Open No. 2009-088915 discloses a method for appropriately selecting a modulation method in a wireless LAN to reduce reception errors and improve communication throughput.

In the IEEE 802.11be standard, a device capable of transmitting and receiving at any timing on links is called a Simultaneous Transmit and Receive (STR) device. On the other hand, a device that cannot transmit and receive at any timing on links and needs to transmit and receive at adjusted timings on the links is called a Non-STR device.

If the Non-STR device (transmitting side) intends to concurrently transmit or receive consecutive packets on the links, the amount of data in the packets to be transmitted and the MCS are determined in advance in order to concurrently perform transmission and reception on the links, and then transmission and reception are started. A series of transmission operations is completed when all of the packets reach the receiving side and an acknowledgment (Ack), which is an acknowledgment (a reception response) for each transmission packet, or a block Ack arrives from the receiving side to the transmitting side. However, if the Ack is not transmitted from the receiving side, or if the transmitting side cannot receive the Ack due to, for example, interference of disturbing waves with the Ack, it is determined on the transmitting side that the transmission operation of the transmitted packets could not be completed.

If the transmitting side cannot receive the Ack on one link while continuously transmitting packets on the links, the transmitting side needs to retransmit the packet for which the Ack was not received. It is important to prevent a decrease in communication efficiency due to retransmission of the packet.

SUMMARY OF THE INVENTION

The present invention suppresses a decrease in communication efficiency due to packet retransmission in multi-link communication.

According to one aspect of the present invention, there is provided communication apparatus capable of continuously transmitting a plurality of packets to a partner apparatus on a plurality of links, comprising: one or more processors; and one or more memories that stores a computer-readable instruction for causing, when executed by the one or more processors, the one or more processors to function as: a transmission unit configured to concurrently transmit packets to the partner apparatus on the plurality of links; a determination unit configured to determine whether an acknowledgment for a packet transmitted by the transmission unit has been received on each of the plurality of links; and a generation unit configured to generate a changed packet by increasing a length of a packet transmitted by the transmission unit, wherein if it is determined by the determination unit that an acknowledgment for a first packet transmitted on a first link among the plurality of links has not been received, the generation unit generates a changed first packet having an increased packet length by reducing a data rate of the first packet, and generates a changed subsequent packet by increasing the packet length of a packet subsequent to a packet transmitted on each of one or more links other than the first link among the plurality of links, and the transmitting unit concurrently transmits the changed first packet on the first link and the changed subsequent packet on each of the one or more links other than the first link.

Further features of the present invention will become apparent from the following description of exemplary embodiments with reference to the attached drawings.

DESCRIPTION OF THE EMBODIMENTS

Figure 1:
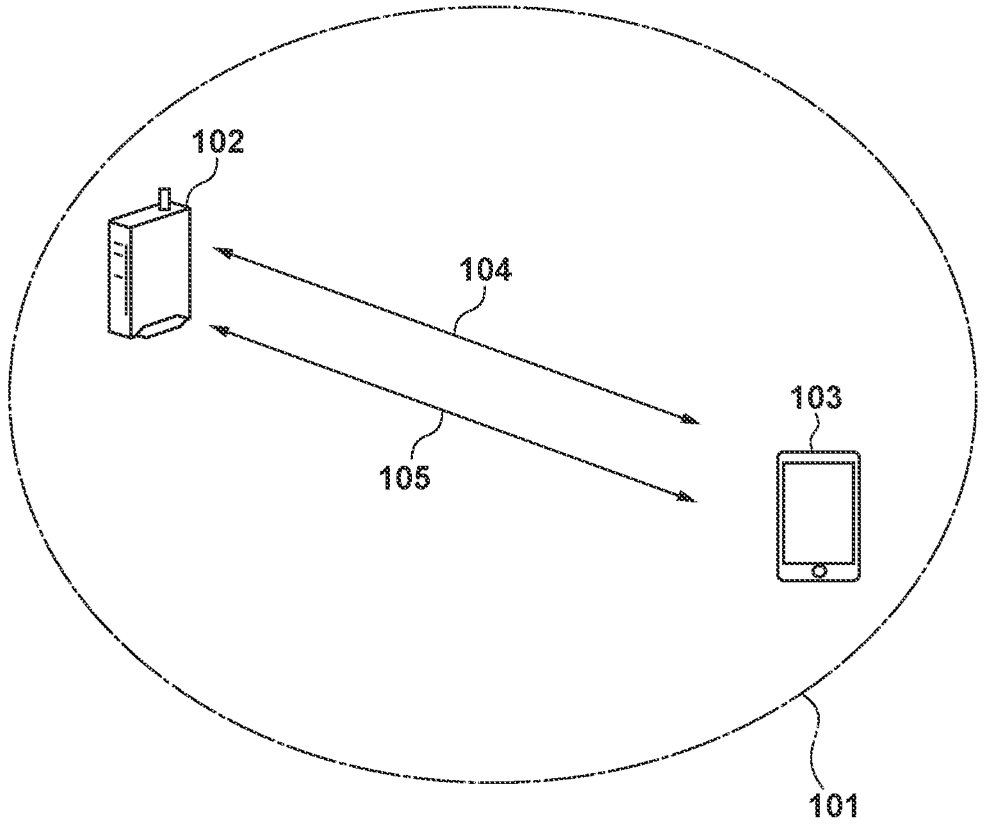
FIG. 1 is a diagram illustrating a configuration example of a wireless communication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Wireless Communication System

FIG. 1 is a diagram illustrating a configuration example of a wireless communication system according to the present embodiment. An access point (AP) 102 is a communication apparatus having a role of constructing a network 101. Note that the network 101 is a wireless network. A station (or a terminal apparatus, STA) 103 is a communication apparatus having a role of joining the network 101. Each communication apparatus complies with the IEEE 802.11be (Extremely/Extreme High Throughput (EHT)) standard, and can perform wireless communication conforming to the IEEE 802.11be standard via the network 101. Each communication apparatus can communicate in frequency bands of 2.4 GHz band, 5 GHz band, and 6 GHz band. The frequency band used by each communication apparatus is not limited to this, and different frequency bands may be used, for example, 60 GHz band. Further, each communication apparatus can communicate using bandwidths of 20 MHz, 40 MHz, 80 MHz, 160 MHz, and 320 MHz.

Further, the AP 102 and the STA 103 can perform multi-link communication that establishes links over a plurality of frequency channels and communicates. The AP that performs multi-link communication is also called AP MLD-multi-link. MLD is an abbreviation for multi-link Device. Here, the frequency channel is a frequency channel defined in the IEEE 802.11 series standard and refers to a frequency channel capable of performing wireless communication conforming to the IEEE 802.11 series standard, in the IEEE 802.11 series standard, a plurality of frequency channels are defined in each frequency band such as 2.4 GHz band, 5 GHz band, and 6 GHz hand. Further, in the IEEE 802.11 series standard, the bandwidth of each frequency channel is defined as 20 MHz. Note that a bandwidth of 40 MHz or more may be used in one frequency channel by bonding to an adjacent frequency channel.

For example, the AP 102 can establish a first link 104 over a first frequency channel in the 2.4 GHz band with the STA 103 and a second link 105 over a second frequency channel in the 5 GHz band, to communicate with each other via both links. In this case, the AP 102 maintains the second link 105 over the second frequency channel in parallel with the first link 104 over the first frequency channel. In this way, the AP 102 can improve throughput in communication with the STA 103 by establishing links with the STA 103 over the frequency channels.

Further, the AP 102 and the STA 103 may establish a plurality of links having different frequency bands in multi-link communication. For example, the AP 102 and the STA 103 may establish a third link (not illustrated) in the 6 GHz band in addition to the first link 104 in the 2.4 GHz band and the second link 105 in the 5 GHz band. Alternatively, the AP 102 and the STA 103 may establish links over a plurality of different channels included in the same frequency band. For example, the AP 102 and the STA 103 may establish the first link 104 over 1ch in the 2.4 GHz band and the second link 105 over 11ch in the 2.4 GHz band.

Further, links having the same frequency band and links having different frequency bands may coexist. For example, the AP 102 and the STA 103 may establish the third link (not illustrated) over 36ch in the 5 GHz band in addition to the first link 104 over 1ch in the 2.4 GHz band and the second link 105 over 11ch in the 2.4 GHz band. By establishing a plurality of connections having different frequency bands from the STA 103, the AP 102 can communicate with the STA 103 in another band even when one band is congested, so that it is possible to prevent a decrease in throughput in communication with the STA 103.

In multi-link communication, the links established by the AP 102 and the STA 103 are only required to have at least different frequency channels. Note that in multi-link communication, a channel spacing of the frequency channels of the links established by the AP 102 and the STA 103 is only required to be at least larger than 20 MHz. Note that in the present embodiment, the AP 102 and the STA 103 establish the first link 104 and the second link 105, but may establish three or more links.

When performing multi-link communication, the AP 102 constructs a plurality of wireless networks so as to correspond to each link. In this case, the AP 102 has a plurality of APs internally, and each AP is operated to construct the wireless network. The AP included in the AP 102 may be one or more physical APs, or may be a plurality of logical APs configured in one physical AP. Note that when the links are established in the frequency channels belonging to a common frequency band, a common wireless network may be used for the links.

When performing multi-link communication, the AP 102 and the STA 103 can divide one data and transmit it to a partner apparatus via the links. Alternatively, the AP 102 and the STA 103 can transmit the same data via each of the links, so that communication via one link can be backup communication for communication via the other link.

Specifically, it is assumed that the AP 102 transmits the same data to the STA 103, via the first link 104 over the first frequency channel and the second link 105 over the second frequency channel. In this case, for example, even when an error occurs in the communication via, the first link 104, the same data is transmitted via the second link 105, so that the STA 103 can receive the data transmitted from the AP 102.

Alternatively, the AP 102 and the STA 103 may use different links depending on the type of frame to be communicated and the type of data. The AP 102 may, for example, transmit the management frame via the first link 104, and the data frame including the data via the second link 105, Note that the management frame is a management frame conforming to the IEEE 802.11 series standard. Specifically, the management frame refers to a Beacon frame, a Probe Request frame/Response frame, and an Association Request frame/Response frame. In addition to these frames, a Disassociation frame, an Authentication frame, a De-Authentication frame, and an Action frame are also called management frames. The Beacon frame is a frame for notifying network information. Further, the Probe Request frame is a frame for requesting the network information, and a Probe Response frame is a response to the Probe Request frame and is a frame for providing the network information. The Association Request frame is a frame for requesting connection, and an Associate Response frame is a response to the Association Request frame and is a frame indicating connection permission, an error, or the like. The Disassociation frame is a frame for disconnecting the connection. The Authentication frame is a frame for authenticating the partner apparatus, and the De-Authentication frame is a frame for interrupting authentication of the partner apparatus and disconnecting the connection. The Action frame is a frame for performing additional functions other than the above. Alternatively, when transmitting, for example, data related to a captured image, the AP 102 may transmit meta information such as a date, parameters (aperture value and shutter speed) at the time of imaging, and position information via the first link 104, and pixel information via the second link 105.

Further, the AP 102 and the STA 103 may be able to perform Multiple-Input and Multiple-Output (MIMO) communication. In this case, the AP 102 and the STA 103 have a plurality of antennas, one of which transmits a different signal from each antenna using the same frequency channel. The receiving side concurrently receives all the signals arriving from a plurality of streams using the antennas, separates the signals of each stream, and decodes them. By performing MIMO communication in this way, the AP 102 and the STA 103 can communicate more data in the same amount of time as compared with a case where MIMO communication is not performed. Further, the AP 102 and the STA 103 may perform MIMO communication on some links when performing multi-link communication.

Note that the AP 102 and the STA 103 comply with the IEEE 802.11be standard, but in addition to this, they may comply with at least one of legacy standards which are standards prior to the IEEE 802.11be standard. The legacy standards are the IEEE 802.11a/b/g/n/ac/ax standards. Note that in the present embodiment, at least one of the IEEE 802.11a/b/g/n/ac/ax/be standards is referred to as the IEEE 802.11 series standard. In addition to the IEEE 802.11 series standards, the AP 102 and the STA 103 may comply with other communication standards such as Bluetooth (registered trademark), Near Field Communication (NFC), Ultra Wide Band WWB), Zigbee, and Multi Band OFDM Alliance (MBOA). Note that OFDM is an abbreviation for Orthogonal Frequency Division Multiplexing. Further, UWB includes wireless USB, wireless 1394, Winet, and the like. Furthermore, the AP 102 and the STA 103 may comply with a communication standard for wired communication such as a wired LAN.

Specific examples of the AP 102 include, but are not limited to, a WLAN router, a PC, and the like. The AP 102 may be any communication apparatus capable of performing multi-link communication with another communication apparatus. Further, the AP 102 may be an information processing device such as a wireless chip capable of performing wireless communication conforming to the IEEE 802.11be standard. Further, specific examples of the STA 103 include, but are not limited to, cameras, tablets, smartphones, PCs, mobile phones, video cameras, and the like. The STA 103 may be any communication apparatus capable of performing multi-link communication with the other communication apparatus. Further, the STA 103 may be the information processing device such as the wireless chip capable of performing wireless communication conforming to the IEEE 802.11be standard. Further, the communication system of FIG. 1 includes one AP and one STA, but the number of APs and STAB is not limited to this. Note that the information processing device such as the wireless chip may have an antenna for transmitting a generated signal.

Note that in the present embodiment, the AP 102 is an access point and the STA 103 is a station, but the present invention is not limited to this, and both the AP 102 and the STA 103 may be stations. In this case, the AP 102 is the station, but can operate as an apparatus having a role of constructing the wireless network for establishing the link with the STA 103.

Configuration of Communication Apparatus

Figure 2A:
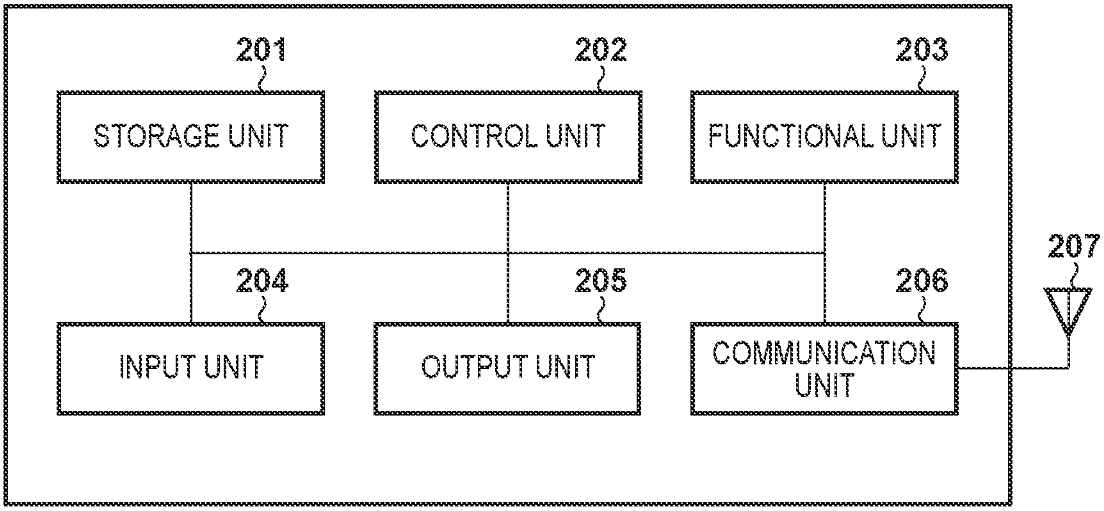
FIG. 2A is a diagram illustrating an example of a hardware configuration of a communication apparatus.
Figure 2B:
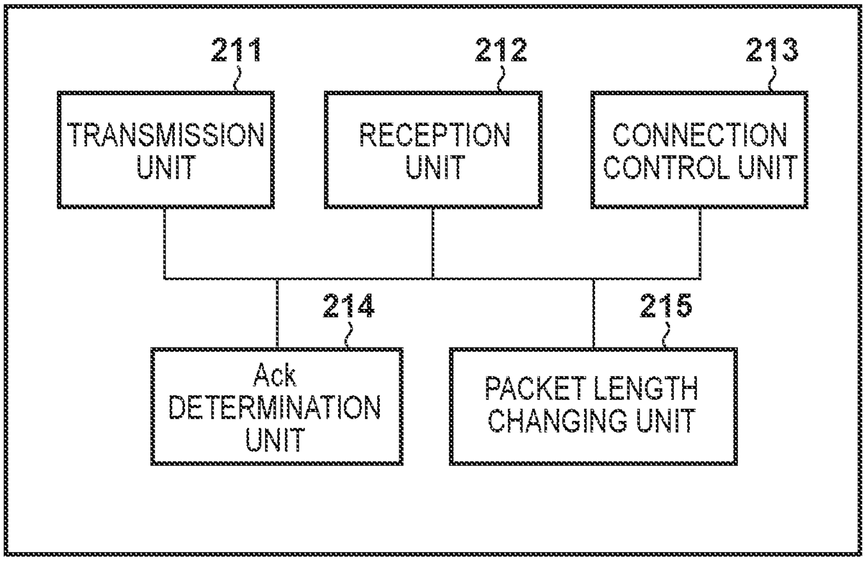
FIG. 2B is a diagram illustrating an example of a functional configuration of the communication apparatus.

FIGS. 2A and 2B illustrate configuration examples of communication apparatuses (AP. STA). FIG. 2A is an example of a hardware configuration of the communication apparatus, and FIG. 2B is an example of a functional configuration of the communication apparatus. First, the hardware configuration of the communication apparatus will be described with reference to FIG. 2A. Although the AP 102 will be described here as an example, the same description can be applied to the STA 103, and in that case, the communication partner apparatus of the STA 103 can be the AP 102.

A storage unit 201 includes one or more memories such as Read Only Memory (ROM) and Random Access Memory (RAM), and stores computer programs for performing various operations described later, and various information such as communication parameters for wireless communication. Note that as the storage unit 201, storage media such as flexible disks, hard disks, optical disks, magneto-optical disks, CD-ROMs, CD-Rs, magnetic tapes, non-volatile memory cards, and DVDs may be used in addition to the memories such as ROM and RAM. Further, the storage unit 201 may include a plurality of memories and the like.

A control unit 202 includes, for example, one or more processors such as a Central Processing Unit (CPU) and a Micro Processing Unit (MPU), and controls the entire AP 102 by executing a computer program stored in the storage unit 201. Note that the control unit 202 may control the entire AP 102 by cooperation of the computer program stored in the storage unit 201 with the operating system (OS). Further, the control unit 202 generates the data and the signals (radio frames) to be transmitted in communication with the other communication apparatus. Further, the control unit 202 may include a plurality of processors such as a multi-core processor and control the entire AP 102 by the processors.

Further, the control unit 202 controls a functional unit 203 to perform predetermined processing such as wireless communication, imaging, printing, and projection. The functional unit 203 is hardware for the AP 102 to perform the predetermined processing.

An input unit 204 receives various operations from a user. An output unit 205 provides various outputs to the user via a monitor screen or a speaker. Here, the output by the output unit 205 may be display on the monitor screen, audio output by the speaker, vibration output, or the like. It should be noted that both the input unit 204 and the output unit 205 may be implemented by one module as in a touch panel. Further, each of the input unit 204 and the output unit 205 may be integrated with or separate from the AP 102.

A communication unit 206 controls wireless communication conforming to the IEEE 802.11be standard. Further, the communication unit 206 may control wireless communication conforming to other IEEE 802.11 series standards in addition to the IEEE 802.11be standard, and may control wired communication such as a wired LAN. The communication unit 206 controls an antenna 207 to transmit and receive signals for wireless communication generated by the control unit 202, The AP 102 may have a plurality of the communication units 206. The AP 102 having the communication units 206 can establish at least one link per communication unit 206 when establishing the links in multi-link communication. Alternatively, the AP 102 may establish the links using one communication unit 206. In this case, the communication unit 206 performs communication via the links by switching the frequency channels operating in time division. When the AP 102 complies with the NFC standard, Bluetooth standard, or the like in addition to the IEEE 802.11be standard, the AP 102 may perform control of wireless communication conforming to these communication standards. Further, when the AP 102 can perform wireless communication conforming to the communication standards, the AP 102 may be configured to have the communication units and the antennas respectively complying with the communication standards. The AP 102 communicates data such as image data, document data, and video data with the STA 103 via the communication unit 206. Note that the antenna 207 may be configured as a separate body from the communication unit 206, or may be configured as one module together with the communication unit 206.

The antenna 207 is an antenna capable of communicating in various frequency bands. In the present embodiment, the AP 102 has one antenna, but may have a different antenna for each frequency band. Further, when the AP 102 has the antennas, the AP 102 may have the communication units 206 respectively corresponding to the antennas.

Next, software function configuration of the communication apparatus will be described with reference to FIG. 2B. Although the AP 102 will be described here as an example, the same description can be applied to the STA 103.

A transmission unit 211 performs transmission processing via the communication unit 206 (FIG. 2A), A reception unit 212 performs reception processing via the communication unit 206. A connection control unit 213 controls to establish a connection with the partner apparatus by transmitting and receiving various frames via the transmission unit 211 and the reception unit 212. An Ack determination unit 214 determines whether an Ack (acknowledgement/reception response) has been received from the partner apparatus by the reception unit 212 with respect to the transmitted data. A packet length changing unit 215 changes a packet length of a packet transmitted via the transmission unit 211, and controls to generate the changed packet.

Transmission and Reception Operation in Multi-Link Communication

Figure 3:
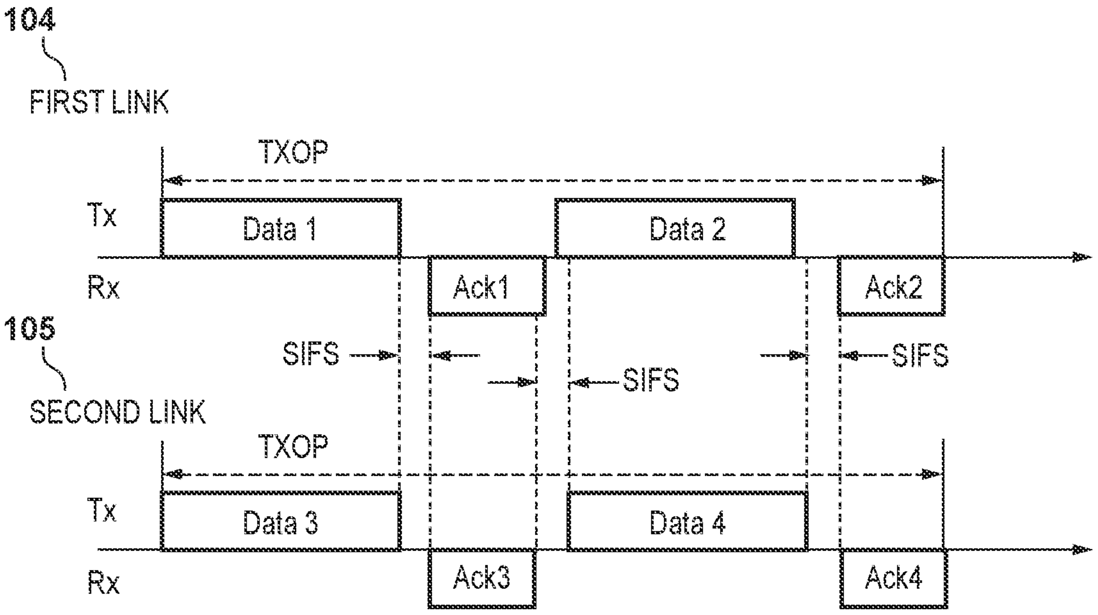
FIG. 3 is a diagram illustrating an example of a timing chart of multi-link communication.

Next, transmission and reception operation in multi-link communication will be described. First, operation when the Ack is normally received on the transmitting side will be described with reference to FIG. 3. FIG. 3 illustrates an example of a timing chart of multi-link communication. It is assumed that the AP 102 (transmitting side (Tx)) and the STA 103 (receiving side (Rx)) are fleeted by multi-link communication using the first link 104 and the second link 105. Note that the operation of FIG. 3 can be similarly applied to a case when the transmitting side is the STA 103 and the receiving side is the AP 102.

In this example, it is assumed that the first link 104 and the second link 105 use frequencies relatively close to each other. Thus, in the STA 103, since the signal transmitted by one link causes radio wave interference to the other link, there is a limitation that the signal cannot be received by the other link while the signal is being transmitted by the one link. That is, the STA 103 is the above-mentioned Non-Simultaneous Transmit and Receive (STR) device. In order to perform multi-link communication with the STA 103 that is the Non-STR device, it is necessary to adjust so that the other link is not in a receiving state while the signal is being transmitted by the one link. Specifically, the AP 102 and the STA 103 need to match transmission timings on the links.

On the other hand, IEEE 802.11e, which has been standardized as a mechanism for performing quality of service (QoS) control, defines an Enhanced Distributed Channel Access (EDCA) scheme that prioritizes transmission of high-priority frames. In the EDCA scheme, the packet is transmitted according to an access category (AC) as priority set according to traffic type. Further, in the EDCA scheme, a parameter called TXOP Limit is set as one of parameters for QoS control set for each priority. The TXOP Limit may be held in each apparatus in advance, or may be obtained (and updated) by a predetermined frame received. The TXOP Limit indicates an upper limit time of a continuous transmittable period (Transmission Opportunity (TXOP)) obtained (secured) after acquiring a transmission right once. Further, the TXOP Limit is defined for each access category (AC). For example, when the TXOP limit=0, transmission of only one packet is permitted, and when the value is other than 0, continuous transmission of a plurality of the packets is permitted.

In FIG. 3, the transmitting side (AP 102) starts transmitting data 1 and data 3 (the data can correspond to (QoS) data packet, the same applies below) having the same packet length at the same timing during a period of the TXOP obtained on the first link 104 and the second link 105. Note that the TXOP is obtained (secured), for example, when the transmitting side transmits a predetermined frame based on Carrier Sense Multiple Access with Collision Avoidance (CSMA/CA) and the response frame is correctly received from the receiving side. When the data 1 and the data 3 are received by the receiving side (STA 103), the receiving side issues and transmits Ack1 and Ack3 for the data 1 and the data 3 after the lapse of Short Inter Frame Sequence (SIFS) time. The transmitting side receives Ack1 and Ack3 after the SITS time has elapsed after transmitting the data 1 and the data 3. Further, the transmitting side starts again transmitting data 2 and data 4 having the same packet length at the same timing on the first link 104 and the second link 105 after the SIFS time has elapsed after receiving Ack1 and Ack3. The transmitting side can receive Ack2 and Ack4 for the data 2 and the data 4, and the data transmission has ended normally during the TXOP period.

However, when the transmitting side does not normally receive Ack for the data after transmitting the data (data packet), it can be determined that the data transmission has not ended normally. Here, for example, in FIG. 3, it is assumed that the data 3 could not be normally received on the receiving side on the second link 105, and Ack3 could not be issued and transmitted.

There are two main possible causes that the receiving side did not receive the data 3 normally. The first cause is that there is a change in a communication path of a radio signal between the transmitting side and the receiving side, and signal strength of the signal arriving at the receiving side is reduced. For example, when the transmitting side moves or an obstacle appears in the communication path, it causes a reduction in signal strength. The second cause is that Signal to Noise (SN) ratio of the signal is deteriorated by interference waves. Receiving the interference waves from other wireless equipment or equipment that generates radio waves (not illustrated) can cause a reduction in SN ratio.

When the receiver failed to receive the data normally due to at least one of these two causes, or any other cause, and did not issue the Ack, even if the transmitting side retransmits the same data (packet) in the same format, it is conceivable that there is high possibility that the receiving side cannot receive the data correctly again. When the transmitting side retransmits the packet that was not normally received by the receiving side, there are two conceivable methods for increasing the possibility of successful retransmission.

The first method is to lower the Modulation and Coding Scheme (MCS), As described above, the MCS is an index of the combination of the radio modulation scheme and the coding rate. Lowering the MCS means that the packet length will be longer if the packet has the same amount of data. If the cause of the transmission failure is a change in the communication environment, there is a high possibility that the transmission will fail again even if the retransmission is performed with the same MCS. In order to increase the probability of successful transmission, it is considered effective to lower the MCS and increase the reach of the radio signal. On the other hand, lowering the MCS means that the packet length is longer if the amount of data is the same. If only the packet length on one link is increased, the extended packet length overlaps the Ack when the Ack is received on the other link, and thus the communication may not be performed correctly on the other link.

The second method is to suspend continuous packet transmission on the link where the packet transmission fails, and wait until the continuous packet transmission on the other link ends, Thus, influence on the communication on the other link can be avoided, but communication efficiency/space utilization efficiency may be reduced by not performing the transmission in a period during which the TXOP is secured.

Figure 4:
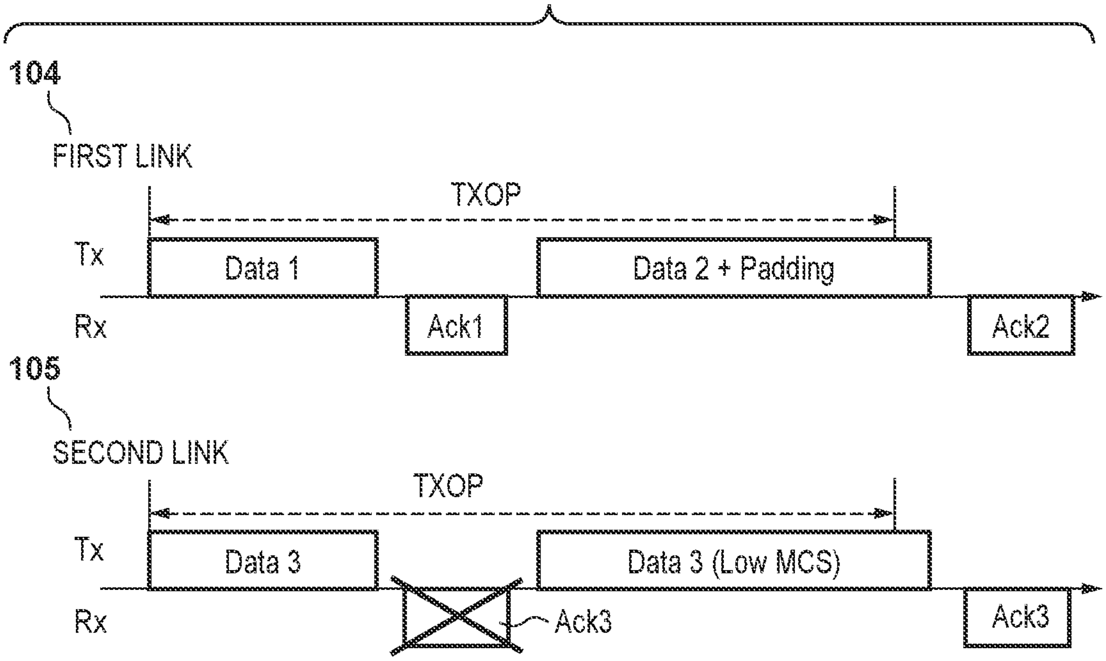
FIG. 4 is an example of a timing chart of multi-link communication according to an embodiment.

Therefore, in the present embodiment, the packet length of the packet to be transmitted is adjusted as described below. FIG. 4 illustrates an example of a timing chart of multi-link communication according to the present embodiment. Similar to FIG. 3, it is assumed that the AP 102 (receiving side (Rx)) and the STA 103 (transmitting side (Tx)) are connected by multi-link communication using the first link 104 and the second link 105. It is assumed that the transmitting side could not receive Ack3 (the transmission of the data 3 failed) on the second link 105 after transmitting the data 1 and the data 3 on the first link 104 and the second link 105.

The transmitting side that could not receive Ack3 lowers the MCS and retransmits the data 3 (Low MCS) on the second link 105, and concurrently increases, on the first link 104 on which the transmission has not failed, the packet length to the same level as the packet length of the data on the second link 105. As a method for increasing the packet length, a method called padding in which dummy data is added is generally used. This makes it possible to increase the probability of successful retransmission on the second link 105 and maintain multi-link communication with the STA 103 that is the Non-STR device. As a result, success rate of continuous packet transmission can be increased, and as a result, a reduction in space utilization efficiency can be avoided.

As a result of increasing the packet length, the transmission and reception may continue beyond the period of the TXOP obtained in advance. However, since the wireless LAN adopts the CSMA/CA method, if the transmission and reception continues at the end of the TXOP period, the other wireless LAN equipment does not start transmission by detecting the transmission and reception radio signal. Therefore, even if the continuous transmission exceeds the TXOP period, it can be expected that the transmission and reception operation can be completed normally.

Further, since Ack1 can be correctly received following the data 1 on the first link 104, the transmitting side does not need to change the MCS, but since the packet length of the data 2 is increased along with the change on the second link 105, the MCS may be lowered according to the increased packet length. In FIG. 4, the padding is used for the data 2 in order to make the packet length the same as that of the data 3, but it can be expected that transmission success probability of the data 2 will be increased by lowering the MCS and minimizing the padding.

Further, when transmitting three or more consecutive packets, the transmitting side may apply a change in packet length of the data to be retransmitted only to the last packet of the consecutive packets within the TXOP period. If the packet length is changed for a packet other than the last packet, there is a possibility that the transmission is stopped at the timing when the TXOP period ends, and thus there is a high possibility that the wireless communication will collide. Further, in order to prepare a means for avoiding the collision, more complicated processing is required. To simplify the processing, it can be effective to limit the change in packet length to the last packet of the consecutive packets.

Note that the data (data packet) continuously transmitted by the transmitting side may be data in which a plurality of frames are concatenated by frame aggregation, and the Ack (transmitted by the receiving side) received at this time is a block Ack. Even when the block Ack cannot be normally received, the transmitting side can expect the same effect as described above by performing the same processing as in the case of the above Ack.

Processing Flow by Transmitting Side

Figure 5:
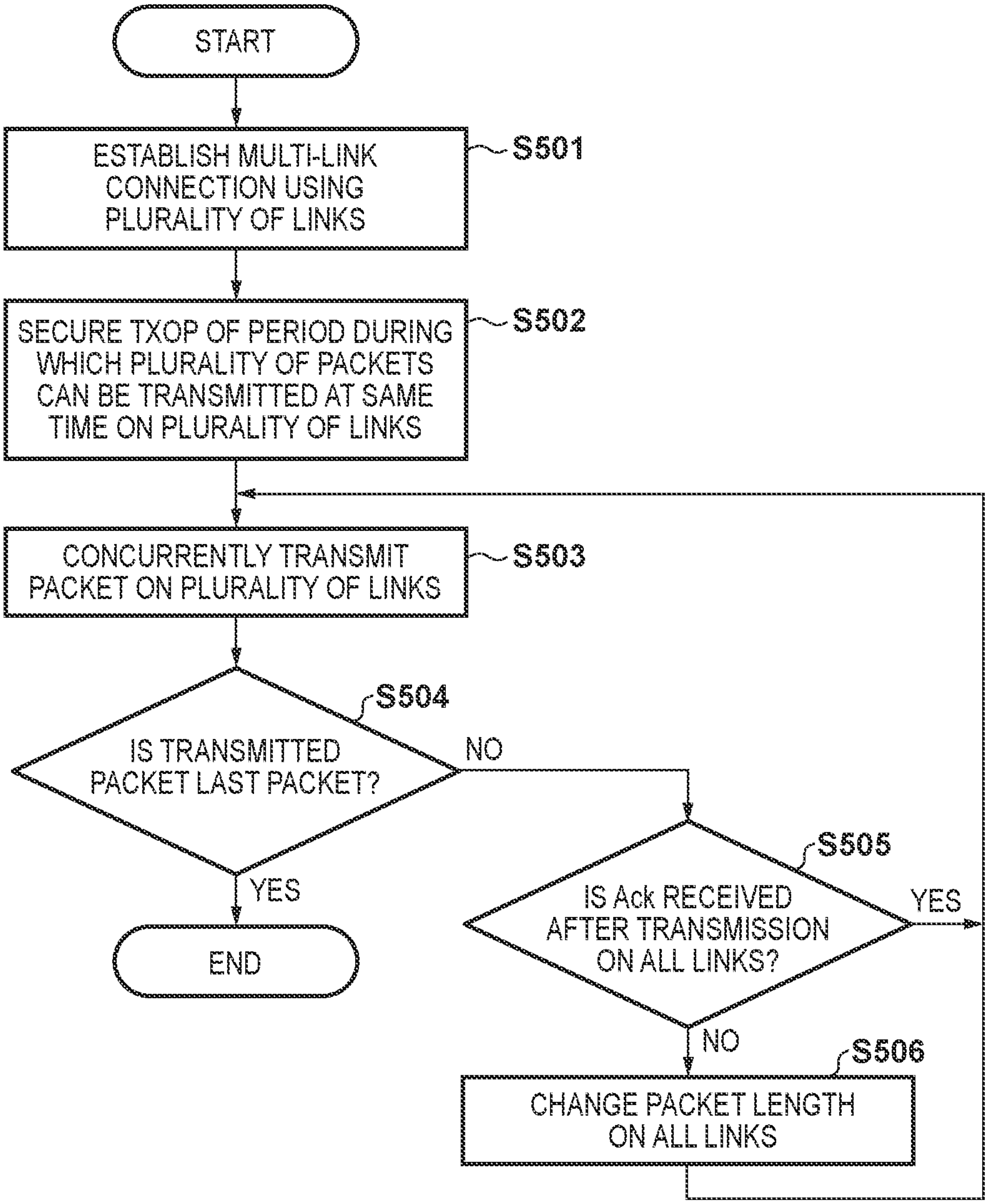
FIG. 5 is a flowchart of a series of continuous transmission processing performed by a transmitting side apparatus according to the embodiment.

FIG. 5 illustrates a flowchart of a series of continuous transmission processing performed by a transmitting side apparatus according to the present embodiment. Here, it is assumed that the transmitting side apparatus is the AP 102, a receiving side apparatus is the STA 103, and the STA 103 is the Non-STR device. The flowchart illustrated in FIG. 5 can be implemented by the control unit 202 of the AP 102 executing the control program stored in the storage unit 201, performing calculation and processing of information, and controlling each hardware. Note that the same description can be applied even if the transmitting side apparatus is the STA 103.

First, in step S501, the connection control unit 213 of the AP 102 establishes a multi-link connection using a plurality of links with the STA 103. Here, since the STA 103 is the Non-STR device, in order to concurrently transmit and receive on the links, it is necessary that transmission and reception timings on the links match each other. This is the same whether the AP 102 transmits or the STA 103 transmits.

In step S502, the transmission unit 211 of the AP 102 secures (obtains) TXOP of a period during which a plurality of packets ((QoS) data packets) can be continuously transmitted at the same time on the links. The transmission unit 211 of the AP 102 concurrently transmits one data packet having the same packet length on each of the links to the STA 103 in step S503, based on the obtained TXOP. The transmission unit 211 checks whether the transmitted packet is the last packet of a series of continuous transmissions. If the transmitted packet is the last packet (Yes in step S504), the processing ends. If it is not the last packet (No in step S504), the Ack determination unit 214 of the AP 102 determines whether the Ack has been received from the receiving side by the reception unit 212 on all links on which the transmission has been performed (step S505).

If the Ack can be received on all links (Yes in step S505), the processing returns to step S503. On the other hand, when the Ack cannot be received on one or more links (No in step S505), there is a high possibility that the transmission will fail again even if the retransmission is performed with the same MCS on the link on which the Ack has not been received. Therefore, the AP 102 changes the packet length so that the packet length is the same for all links including the link on which the Ack has been correctly received (step S506). That is, the AP 102 reconstructs a retransmission packet, in which the MCS is lowered and the transmission success probability is increased, for the link on which the Ack has not been received. Further, the AP 102 changes the packet length of subsequent packet to be transmitted for one or more other links other than the link on which the Ack has not been correctly received.

Specifically, the packet length changing unit 215 generates a retransmission packet changed to increase the packet length by reducing the data rate of the packet to be retransmitted on the link on which the Ack has not been received. Further, the packet length changing unit 215 generates the subsequent packet changed to increase the packet length of the subsequent packet of the packet transmitted on the link on which the Ack has been received. The transmitted packet may be a packet transmitted at the same time as the packet transmitted on the link on which the Ack has not been received. The packet length changing unit 215 generates the changed subsequent packet so that a difference between the packet length of the changed subsequent packet and the packet length of the retransmission packet is less than or equal to a predetermined value (preferably the same). As described above, this can be achieved by adding the dummy data, reducing the data rate, or a combination thereof.

In this way, the AP 102 changes the packet length so that the packet length is the same for all links including the link on which the Ack has been correctly received (step S506). At the next transmission start timing, the transmission unit 211 concurrently transmits the retransmission packet and the changed subsequent packet on each of the links (step S503).

Note that in this flowchart, the packet length is changed for the packet that is not the final packet by the determination in step S504, but as described above, the packet length may be controlled to be changed only for the final packet.

According to the embodiment described above, it is possible to reduce the possibility of failing to retransmit data in multi-link communication, and it is possible not only to suppress a decrease in communication efficiency but also to suppress power consumption of the communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, fix example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-065366, filed Apr. 7, 2021, which is hereby incorporated by reference herein in its entirety.

What is claimed is:

1. A communication apparatus capable of continuously transmitting a plurality of packets to a partner apparatus on a first link and a second link, comprising:

one or more processors; and one or more memories that stores a computer-readable instruction for causing, when executed by the one or more processors, the one or more processors to execute a control method, the control method comprising:

concurrently transmitting packets to the partner apparatus on the first link and the second link;

determining whether an acknowledgment for each of transmitted packets is received on each of the first link and the second link;

in a case where it is determined that an acknowledgment for a first packet transmitted on the first link is not received and an acknowledgement for a second packet transmitted on the second link is successfully received;

in a case where the first packet is a last packet included in the plurality of packets, generating a third packet for retransmission of the first packet on the first link and having an increased packet length by reducing a data rate of the first packet, and generating a fourth packet by using padding for increasing a packet length of a packet planned to be transmitted on the second link subsequently to the second packet such that the fourth packet has a same packet length as the third packet, and concurrently transmitting the third packet on the first link and the fourth packet on the second link; and in a case where the first packet is not the last packet, generate a fifth packet for retransmission of the first packet on the first link and having a same packet length with the first packet, and generate a sixth packet having data planned to be transmitted following the second packet on the second link, and concurrently transmitting the fifth packet on the first link and the sixth packet on the second link.

2. The communication apparatus according to claim 1, wherein the fourth packet is generated such that a difference from the packet length of the third packet is equal to or less than a predetermined value.

3. The communication apparatus according to claim 1, wherein the communication apparatus is a communication apparatus conforming to an IEEE 802.11 series standard, and the communication apparatus concurrently transmits packets on the first link and the second link during a Transmission Opportunity Period (TXOP).

4. The communication apparatus according to claim 3, wherein at least one of the communication apparatus and the partner apparatus is a Non-Simultaneous Transmit and Receive (STR) device.

5. The communication apparatus according to claim 3, wherein the communication apparatus is an access point.

6. The communication apparatus according to claim 3, wherein the communication apparatus is a terminal apparatus.

7. A non-transitory computer-readable storage medium that stores a computer program for causing, when executed by a computer included in a communication apparatus capable of continuously transmitting a plurality of packets to a partner apparatus on a first link and a second link, the computer to:

concurrently transmit packets to the partner apparatus on the first link and the second link;

determine whether an acknowledgment for each of transmitted packets is received on each of the first link and the second link;

in a case where it is determined that an acknowledgment for a first packet transmitted on the first link is not received and an acknowledgement for a second packet transmitted on the second link is successfully received, in a case where the first packet is a last packet included in the plurality of packets, generate a third packet for retransmission of the first packet on the first link and having an increased packet length by reducing a data rate of the first packet, and generate a fourth packet by using padding for increasing a packet length of a packet planned to be transmitted on the second link subsequently to the second packet such that the fourth packet has a same packet length as the third packet, and concurrently transmit the third packet on the first link and the fourth packet on the second link; and in a case where the first packet is not the last packet, generate a fifth packet for retransmission of the first packet on the first link and having a same packet length with the first packet, and generate a sixth packet having data planned to be transmitted following the second packet on the second link, and concurrently transmitting the fifth packet on the first link and the sixth packet on the second link.

* * * * *